(12) United States Patent
Bergeron

(10) Patent No.: US 9,807,204 B2
(45) Date of Patent: *Oct. 31, 2017

(54) OPTIMIZED MESSAGE PROCESSING

(71) Applicant: Ixia, Calabasas, CA (US)

(72) Inventor: Matthew R. Bergeron, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 14/640,959

(22) Filed: Mar. 6, 2015

(65) Prior Publication Data

US 2016/0261723 A1  Sep. 8, 2016

(51) Int. Cl.
*H04L 29/06* (2006.01)
*H04L 29/12* (2006.01)

(52) U.S. Cl.
CPC .................................... *H04L 69/22* (2013.01)

(58) Field of Classification Search
None
See application file for complete search history.

(56) References Cited

U.S. PATENT DOCUMENTS

| | | | |
|---|---|---|---|
| 5,717,760 A | 2/1998 | Satterfield | |
| 8,724,498 B2 | 5/2014 | Choi et al. | |
| 2003/0065812 A1* | 4/2003 | Beier | H04L 29/12339 709/236 |
| 2008/0049861 A1 | 2/2008 | Yang | |
| 2010/0184447 A1 | 7/2010 | Miki et al. | |
| 2010/0195743 A1 | 8/2010 | Barsoum et al. | |
| 2010/0290371 A1 | 11/2010 | Beale | |
| 2011/0086659 A1 | 4/2011 | Yoon et al. | |
| 2011/0170439 A1 | 7/2011 | Miki et al. | |
| 2011/0206151 A1 | 8/2011 | McCloud et al. | |
| 2012/0033650 A1 | 2/2012 | Ahn et al. | |
| 2012/0051271 A1 | 3/2012 | Beale | |
| 2012/0063384 A1 | 3/2012 | Bi et al. | |
| 2016/0126976 A1 | 5/2016 | Schwenk et al. | |

OTHER PUBLICATIONS

Non-Final Office Action for U.S. Appl. No. 14/531,953 (Jun. 6, 2016).
Notice of Allowance for U.S. Appl. No. 13/396,577 (Dec. 18, 2013).
Non-Final Office Action for U.S. Appl. No. 13/396,577 (Aug. 8, 2013).

(Continued)

*Primary Examiner* — Eunsook Choi
(74) *Attorney, Agent, or Firm* — Jenkins, Wilson, Taylor & Hunt, P.A.

(57) ABSTRACT

Methods, systems, and computer readable media for optimized message processing are disclosed. According to one exemplary method, the method includes receiving a message including header information. The method further includes determining, using the header information, whether a fast-path identification rule exists for identifying the message. The method also includes in response to determining that the fast-path identification rule does not exist, identifying the message using slow-path processing, determining the fast-path identification rule using the slow-path processing, and storing the fast-path identification rule in a memory.

23 Claims, 4 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

Notice of Allowance and Fee(s) Due for U.S. Appl. No. 14/531,953 (Oct. 6, 2016).

\* cited by examiner

OPTIMIZED MESSAGE PROCESSING

TECHNICAL FIELD

The subject matter described herein relates to message processing. More specifically, the subject matter relates to methods, systems, and computer readable media for optimized message processing.

BACKGROUND

Many nodes (e.g., computing platforms, smartphones, or network devices) communicate data via messages, e.g., Internet protocol (IP) messages. Receiving nodes typically must parse and analyze header information stored in the messages to accurately process the messages. For example, a receiving node may attempt to identify a related message protocol associated with a message. A message protocol may define the content or form of a message in a standardized manner, so that entities using the protocol can communicate with each other unambiguously. A message may have distinct parts with distinct functions. For example, a message may include a routing header that identifies the sender and intended receiver of the message, a payload section that includes the content of the message that is to be delivered, and a checksum that may be used to detect and possibly correct errors that may have been injected into the message while in transit. These distinct parts are commonly referred to as information elements (IEs).

A message protocol may define several different varieties or types of messages. These message types may share some common IEs, such as the routing header or checksum, but may also have IEs that are unique to each type of message. For example, each message may include a message type identifier so that the receiving entity may unambiguously determine which type of message it is receiving and thus know what IEs that message should contain. For each type of message, the message protocol may define not only what IEs that type of message should contain but also what order that the IEs should appear within the message.

An entity that receives messages that adhere to a message protocol may use a programming construct called a protocol tree to parse the received messages. Protocol trees may define one or more valid message formats and/or protocols. For example, a protocol tree may be utilized to determine whether a received message is associated with one or more various protocols, such as a hypertext transfer protocol (HTTP), a general message radio service (GPRS) tunneling protocol (GTP), a transmission control protocol (TCP), a user datagram protocol (UDP), a real-time transport protocol (RTP), an Internet control message protocol (ICMP), or other protocols. The following pseudo code represents some actions that might be taken by a parsing function that traverses a protocol tree for identifying the message as containing header information associated with a HTTP, TCP, UDP, IMCP, and/or other protocols.

```
1   Receive message;
2   Treat as if an IP message, read octet for protocol_ID
3   IF protocol_id = "6" THEN
4       perform additional steps to verify TCP and/or to
        identify other related headers (e.g., HTTP, GTP, etc.)
5   ELSE IF protocol_id = "17" THEN
6       perform additional steps to verify UDP and/or to
        identify other related headers (e.g., GTP, RTP)
7   ELSE IF protocol_id = "1" THEN
8       perform additional steps to verify ICMP and/or
        to identify other related headers
9   ELSE IF protocol_id = "INVALID" THEN
10      perform additional steps to identify other (e.g.,
        non-IP) headers
15  END IF
```

In the pseudo code shown above, the parsing function traverses the protocol tree in the order in which the branches exist within the tree. For example, the first branch may define conditions or logic for identifying and/or verifying a TCP header and/or other related headers (e.g., HTTP), the second branch may define conditions or logic for identifying and/or verifying a UDP header and/or other related headers, and so on through the list of possible message protocols. If the most commonly received message is a non-IP message, however, this means that for most messages the parsing function performs multiple separate and time consuming tests before it identifies the message as a non-IP message. In a conventional system that uses a protocol tree, the performance of the parsing function can vary greatly depending on the specific traffic received. Processing inefficiencies become more and more significant as the size of the protocol tree increases. For example, protocol trees that handle multiple protocols can be quite large and thus even more susceptible to this kind of inefficiency.

Accordingly, a need exists for methods, systems, and computer readable media for optimized message processing.

SUMMARY

Methods, systems, and computer readable media for optimized message processing are disclosed. According to one exemplary method, the method includes receiving a message including header information. The method further includes determining, using the header information, whether a fast-path identification rule exists for identifying the message. The method also includes in response to determining that the fast-path identification rule does not exist, identifying the message using slow-path processing, determining the fast-path identification rule using the slow-path processing, and storing the fast-path identification rule in a memory.

According to one system, the system includes a slow-path processing module configured to identify a message using slow-path processing and a message identification module (MIM). The MIM is configured to receive a message including header information. The MIM is also configured to determine, using the header information, whether a fast-path identification rule exists for identifying the message. In response to determining that the fast-path identification rule does not exist, the MIM is further configured to identify the message using the slow-path processing module, to determine the fast-path identification rule using the slow-path processing module, and to store the fast-path identification rule in a memory.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the term "message" refers to a packet, a frame, or other units of data, e.g., transferable in a communications network.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for optimized message processing. In accordance with some aspects of the subject matter described herein, techniques for optimized message processing may include using a slow-path processing module (e.g., a software implemented protocol tree) for generating one or more fast-path identification rules. For example, when a message is received, a memory (e.g., cache) may be checked first to determine if an appropriate fast-path identification rule exists for identifying the message. If no match is located in the memory, a slow-path processing module may parse and process the message for identification (e.g., classification) purposes. In this example, one or more fast-path identification rules (e.g., masks, bitwise operations, and/or identification information) may be generated using one or more extant paths through a protocol tree and/or other information associated with the processing by the slow-path processing module. Continuing with the example, the logic associated with the one or more extant paths may be condensed, derived, or utilized in generating a comparable mask (e.g., a bitmask or byte mask) for identifying similar messages.

In accordance with some aspects of the subject matter described herein, fast-path identification rules may be stored in a memory (e.g., cache) based on utilization and/or statistics (e.g., based on frequency or popularity). For example, as messages associated with a particular protocol are processed and a frequency threshold is reached, a fast-path identification rule for the protocol may be generated and stored in the memory, while a less often utilized (e.g., a less popular) fast-path identification rule may be removed or overwritten.

Advantageously, in accordance with some aspects of the subject matter described herein, techniques for optimized message processing may utilize a fast-path processing module for frequently received message protocols or types and may utilize a slow-path processing module for other received message protocols or types. Since many environments, including test environments, involve messages associated with a small subset of possible message protocols or types in existence, dynamically generating fast-path identification rules (e.g., based on the most frequently received messages and storage requirements) can allow a fast-path processing module to process a substantial number of received messages, while also minimizing the amount of messages processed by a slow-path processing module.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
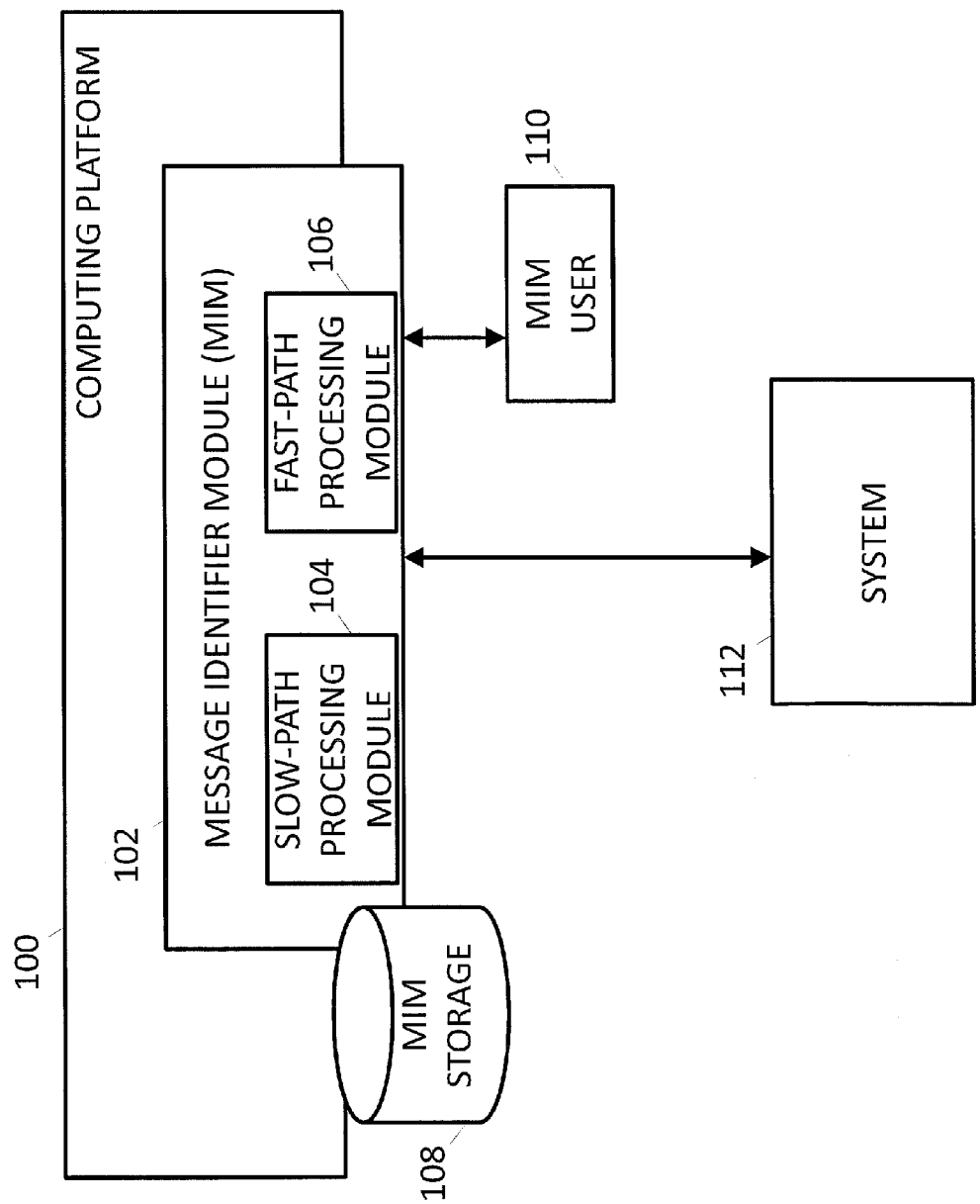
FIG. 1 is a diagram illustrating an exemplary message identification module (MIM) for optimized message processing according to an embodiment of the subject matter described herein.

FIG. 1 is a diagram illustrating an exemplary message identification module (MIM) 102 for optimized message processing according to an embodiment of the subject matter described herein. Referring to FIG. 1, each of computing platform 100 and system 112 may represent any suitable entity or entities (e.g., a computing platform or a device) capable of communicating (e.g., receiving or sending) data via messages.

In some embodiments, computing platform 100 may be a stand-alone tool, a testing device, or software executing on a processor. In some embodiments, computing platform 100 may be a single node or may be distributed across multiple computing platforms or nodes.

In some embodiments, system 112 may include a network device, a network module, a node, or a system of devices, nodes, and/or modules. In some embodiments, system 112 may be a device or system under test. For example, computing platform 100 may be configured to receive from and send messages to system 112 for testing or analyzing the capabilities of system 112.

Computing platform 100 may include or access MIM 102. MIM 102 may represent any suitable entity or entities (e.g., a computing platform, software executing on a processor, a logic device, an ASIC, and/or an FPGA) for performing one or more aspects associated with optimized message processing. For example, MIM 102 may include an IP message parser capable of receiving messages associated with various protocols communicated to or from computing platform 100 and/or system 112. In this example, MIM 102 may be configured to parse, inspect, and/or analyze message information (e.g., message header information) for identifying (e.g., classifying) a message or portions therein.

In some embodiments, MIM 102 may include one or more communications interfaces for interacting with users, systems, and/or nodes. For example, MIM 102 may provide a communications interface for communicating with MIM user 110. In some embodiments, MIM user 110 may be an automated system or may be controlled or controllable by a human user. MIM user 110 may select and/or configure information for inspecting and/or identifying messages.

MIM 102 may include one or more communications interfaces for receiving and sending various types of messages; such as IP messages, IP version 4 (v4) messages, IP version 6 (v6) messages, transmission control protocol (TCP) messages, stream control transmission protocol (SCTP) messages, real-time transport protocol (RTP) messages, or reliable data protocol (RDP) messages, messages using a tunneling protocol, and/or other messages.

MIM 102 may include functionality (e.g., software executing on a processor or other hardware) for inspecting received messages, or portions therein, for particular data, e.g., bit or byte sequences. For example, MIM 102 may be configured to inspect a message header for particular pattern of bits indicative of a particular protocol, session, or type and may be configured to inspect a message header based on relative locations, such as message offsets or byte offsets.

In some embodiments, MIM 102 may include or communicate with a slow-path processing module 104. Slow-path processing module 104 may include any entity or entities (e.g., a computing platform, software executing on a processor, a logic device, an ASIC, and/or an FPGA) for parsing, Inspecting, and/or processing messages, or portions therein, and may be configured to identify (e.g., classify) messages based on one or more logic rules, e.g., conditional statements (e.g., "if-else" logic) stored as a protocol tree (e.g., a binary and/or decision tree) in MIM storage 108. For example, slow-path processing module 104 may include software configured to determine whether a message header includes two consecutive bytes where each byte has a hexadecimal value of "FF". If the message header includes two consecutive bytes where each byte has a hexadecimal value of "FF", slow-path processing module 104 may determine whether the message header length is greater than 60 bytes. If the message header does not include two consecutive bytes where each byte has a hexadecimal value of "FF", slow-path processing module 104 may determine whether the message header includes a byte, located at a header offset of five bytes, having a hexadecimal value of "FA". Slow-path processing module 104 may continue processing conditional statements (e.g., if-else logic) until a message is identified or it is determined that a message cannot be identified.

In some embodiments, slow-path processing module 104 may be capable of identifying messages using parallel processing (e.g., checking multiple conditional statements concurrently) or serial processing (e.g., checking conditional statements one at a time).

In some embodiments, MIM 102 may include or communicate with a fast-path processing module 106. Fast-path processing module 106 may include any entity or entities (e.g., a computing platform, software executing on a processor, a logic device, an ASIC, and/or an FPGA) for parsing, Inspecting, and/or processing messages, or portions therein, and may be configured to identify (e.g., classify) messages based on one or more fast-path identification rules, e.g., masks and/or related information stored in MIM storage 108. For example, fast-path processing module 106 may include a CPLD or FPGA configured to mask and/or compare bits from a message header using one or more masks associated with one or more fast-path identification rules. If a match is found, a corresponding fast-path identification rule may identify an associated message, e.g., as being associated with a particular protocol, session, and/or message type.

In some embodiments, fast-path processing module 106 may be capable of identifying messages using parallel processing (e.g., performing mask comparisons for multiple fast-path identification rules concurrently) or serial processing (e.g., performing mask comparisons for fast-path identification rules one at a time).

In some embodiments, slow-path processing module 104 may generally be slower to process (e.g., identify) a message than fast-path processing module 106. For example, slow-path processing module 104 may use a software implemented protocol tree for identifying messages and a fast-path processing module 106 may use a hardware implemented parser and/or bitwise comparison engine (e.g., using fast-path identification rules or masks) for identifying messages. In this example, slow-path processing module 104 may require more resources (e.g., processor cycles) and/or time than fast-path processing module 106 to accurately identify a message.

In some embodiments, fast-path processing module 106 may be associated with limited memory resources, e.g., in comparison to slow-path processing module 104. For example, fast-path processing module 106 may store or access a number of fast-path identification rules in a high-speed cache, where the number of fast-path identification rules may identify a subset of the total number of message protocols identifiable by slow-path processing module 104. For example, slow-path processing module 104 may be capable of identifying messages as being associated with over 500 hundred protocols. In this example, fast-path processing module 106 may be significantly faster at identifying messages than slow-path processing module 104, but may be restricted to storing five fast-path identification rules that can identify five protocols.

In some embodiments, MIM 102 and/or modules therein may include functionality for gathering, storing, and/or using statistics associated with received and/or processed messages. For example, MIM 102 may maintain information indicating frequencies of received messages that are associated with particular message protocols, e.g., 10% of all received messages may be HTTP messages and 80% of all received messages may be TCP messages. In this example, MIM 102 may use the frequencies to determine whether a fast-path identification rule should be generated and stored (e.g., in MIM storage 108) for future use by fast-path processing module 106. Continuing with the example, if a limited number of fast-path identification rules may be stored, MIM 102 may overwrite or replace fast-path identification rules with more "useful" rules, e.g., as determined by frequency statistics, e.g., MIM 102 may dynamically generate and store fast-path identification rules associated with the ten message protocols most frequently received by MIM 102 in the last five minutes, last hour, or last day.

In some embodiments, MIM 102, slow-path processing module 104, and/or fast-path processing module 106 may include functionality for generating fast-path identification rules using feedback from slow-path processing module 104. For example, slow-path processing module 104 may traverse a protocol tree until a message is identified and MIM 102 and/or modules therein may generate a fast-path identification rule that includes a mask associated with the traversal or path through the protocol tree along with other information (e.g., metadata) usable by fast-path processing module 106.

In some embodiments, MIM 102 may be configured to perform optimized message processing by using fast-path processing module 106 for quickly processing frequently received message protocols using fast-path identification rules and using soft-path processing module 104 for processing messages not processed by fast-path processing module 106. In such embodiments, MIM 102 may monitor received messages and may generate and store fast-path identification rules for the most frequently received message protocols such that processing by slow-path processing module 104 is minimized, thereby optimizing message processing (e.g., parsing).

MIM storage 108 may represent any suitable entity (e.g., a non-transitory computer readable medium or a memory device) for storing data associated with message flows and/or messages. Exemplary data stored at MIM may include fast-path identification rules, message header information, identification statistics, a protocol tree, and/or related protocol identification logic.

In some embodiments, MIM storage 108 may be integrated with or accessible by MIM 102 or modules therein or a node distinct from MIM 102, such as computing platform 100 or system 112. For example, MIM 102 may parse bits and/or bytes associated with a message and store this data in a cache. In this example, slow-path processing module 104 and/or fast-path processing module 106 may be configured to access the cache and use the stored message header information when attempting to identify the message, e.g., as being associated with a particular protocol.

In some embodiments, MIM 102, slow-path processing module 104, and/or fast-path processing module 106 may include functionality for providing information about an identified message to one or more entities (e.g., nodes, software, and/or modules). For example, MIM 102 or a module therein may classify or identify a message as being associated with an HTTP message. In this example, after identifying the message as being associated with an HTTP message, MIM 102 may determine and indicate the start of the http message header, e.g., as an offset value, to one or more entities. By informing relevant entities about the start of certain headers, the entities may handle messages more quickly and accurately.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity, e.g., MIM 102 may be integrated with computing platform 100 or system 112.

Figure 2:
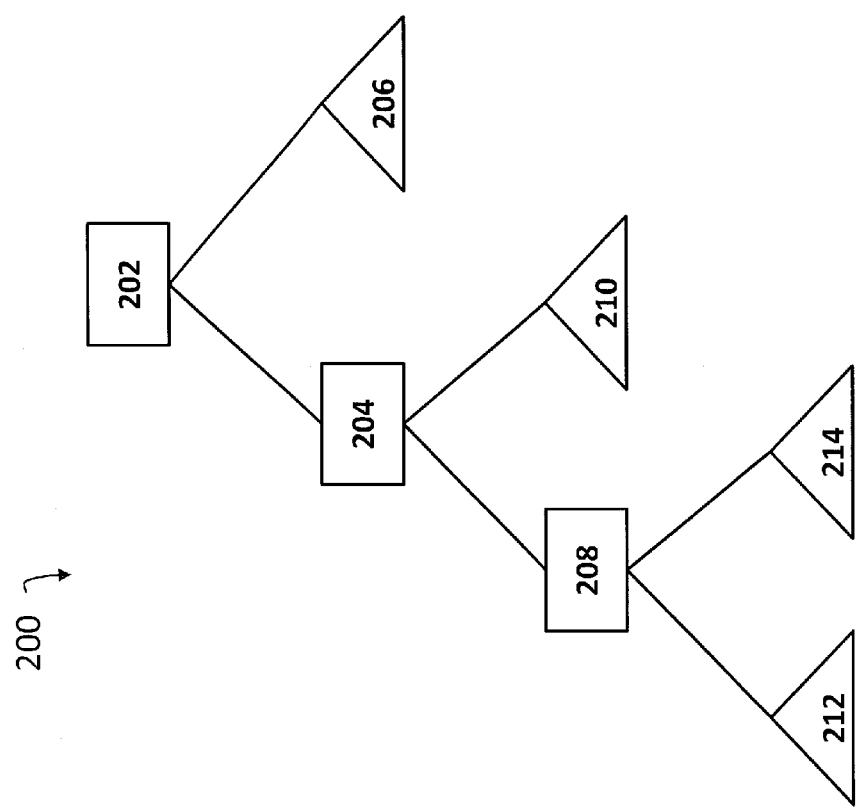
FIG. 2 is a diagram illustrating an exemplary protocol tree according to an embodiment of the subject matter described herein.

FIG. 2 is a diagram illustrating an exemplary protocol tree 200 according to an embodiment of the subject matter described herein. In some embodiments, MIM 102, slow-path processing module 104, and/or fast-path processing module 106 may include functionality for generating fast-path identification rules using protocol tree 200. For example, slow-path processing module 104 may traverse protocol tree 200 until a message is identified. In this example, the traversal may include an extant path through protocol tree 200 comprising one or more conditional statements or decisions (e.g., represented by tree elements in FIG. 2). Continuing with the example, MIM 102 and/or modules therein may generate a fast-path identification rule that includes a mask associated with the extant path (e.g., the set of conditional statements) and may store the mask along with other information (e.g., metadata).

In the embodiment illustrated in FIG. 2, protocol tree 200 may include a set of linked tree elements, where each rectangle shaped tree element is a choice tree element representing a conditional statement or "test" and each triangle shaped tree element is an end tree element representing identification information or that identification information is not determined.

Protocol tree 200 may include a choice tree element 202. In some embodiments, choice tree element 202 may be the root or parent of a sub-tree that defines the valid format or formats for a particular message type or protocol. Choice tree element 202 may represent any logic, conditional statement, or "test" for determining whether a message is identifiable, e.g., as being associated with a particular message type or protocol. For example, choice tree element 202 may represent a conditional statement that involves determining whether a particular octet (e.g., eight bits) in a sequence of octets is a certain value. In another example, choice tree element 202 may represent a conditional statement that involves determining whether a sequence of octets is longer than 60 octets.

In some embodiments, choice tree element 202 may be associated with an end tree element 206. For example, depending on the outcome of choice tree element 202, MIM 102 may traverse choice tree element 202 to reach end tree element 206. In this example, end tree element 206 may either indicate identification information (e.g., an associated message protocol) or may indicate that no identification information may be determined.

In some embodiments, choice tree element 202 may be associated with a choice tree element 204. In some embodiments, choice tree element 204 may be the root or parent of a sub-tree that defines the valid format or formats for a particular message type or protocol. For example, depending on the outcome of choice tree element 202, MIM 102 may traverse choice tree element 202 to reach choice tree element 204. In this example, choice tree element 204 may represent any logic, conditional statement, or "test" for verifying whether a message is identifiable or for determining whether a message is identifiable with an additional protocol. For example, choice tree element 202 may be the parent tree element of a sub-tree that defines the format(s) of a first message protocol, called "Protocol A", while choice tree element 204 may be the parent tree element of a sub-tree that defines the format(s) of a second (e.g., encapsulated) message protocol, called "Protocol B".

In some embodiments, choice tree element 204 may be associated with a choice tree element 208 and an end tree element 210. For example, depending on the outcome of choice tree element 204, MIM 102 may traverse choice tree element 204 to reach choice tree element 208. In this example, choice tree element 204 may represent any logic, conditional statement, or "test" for verifying whether a message is identifiable or for determining whether a message is identifiable with an additional protocol, such as a protocol called "Protocol C". In another example, depending on the outcome of choice tree element 204, MIM 102 may traverse choice tree element 204 to reach an end tree element 210 which may indicate identification information or may indicate that no identification information may be determined.

In some embodiments, choice tree element 208 may be associated with end tree elements 212 and 214. For example, depending on the outcome of choice tree element 208, MIM 102 may traverse choice tree element 208 to reach end tree element 212 or end tree element 214.

In some embodiments, protocol tree 200 may allow decisions points to jump backwards, e.g., to one or more preceding decision points, in protocol tree 200. In such embodiments, such decision points may be useful for parsing tunneling protocols with nested layers of IP, UDP, and/or other protocols. For example, choice tree elements 202-208 may identify IP, UDP, and/or other protocols. In this example, if at choice tree element 208 it is determined that a nested protocol may be associated with a message being parsed, choice tree element 202 may be revisited in attempt to parse and identify the nested protocol.

It will also be appreciated that protocol tree 200 is for illustrative purposes and that different and/or additional information may be utilized by slow-path processing module 104. For example, in some embodiments, an end tree elements or another type of tree element not shown may be the parent of its own sub-tree, according to the complexities of a particular protocol or type. Thus, protocol tree 200 may be as simple or as complicated as required to fully describe all of the valid message formats and variations that are defined or allowed by a particular protocol or type. In another example, in some embodiments, tree elements of protocol tree 200, such as tree elements 202, 204, 206, 208, 210, 212, and 214 may be implemented as a linked list or other suitable programming construct.

Figure 3:
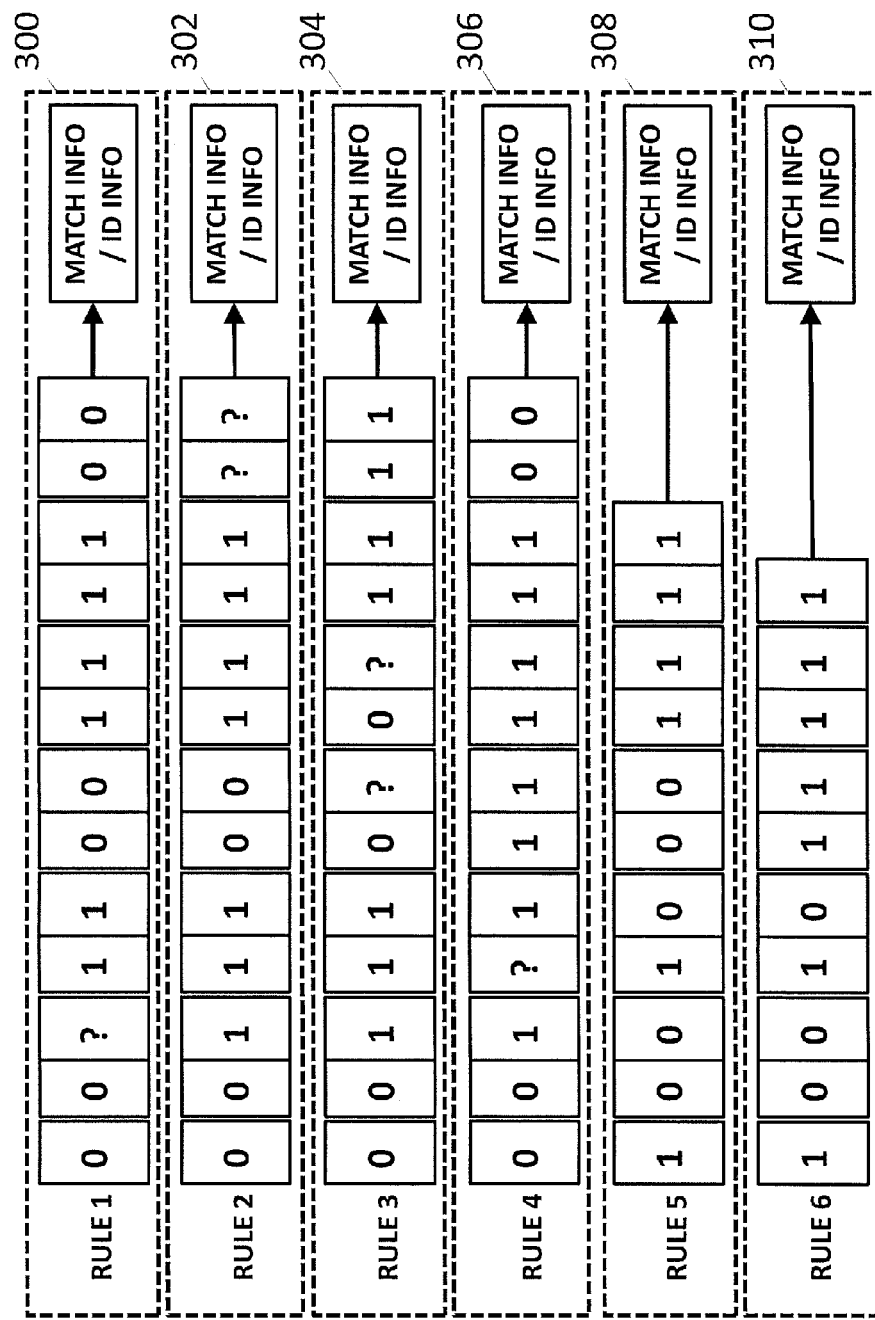
FIG. 3 is a diagram illustrating exemplary fast-path identification rules according to an embodiment of the subject matter described herein.

FIG. 3 is a diagram illustrating exemplary fast-path identification rules 300, 302, 304, 306, 308, and 310 according to an embodiment of the subject matter described herein. Each of fast-path identification rules 300, 302, 304, 306, 308, and 310 may represent information usable to identify a message. In some embodiments, each of fast-path identification rules 300, 302, 304, 306, 308, and 310 may include a mask, matching information (e.g., a match key), and identification information. Exemplary masks associated with fast-path identification rules 300, 302, 304, 306, 308, and 310 may include a bitmask, a multi-bitmask, a byte mask, or a multi-byte mask for identifying a relevant portion of a message to compare or inspect. Exemplary matching information associated with fast-path identification rules 300, 302, 304, 306, 308, and 310 may include a hash value, a key, or other information for indicating that a fast-path identification rule matches a message or message header portion. Exemplary identification information associated with fast-path identification rules 300, 302, 304, 306, 308, and 310 may include information indicating a particular protocol, session, or type associated with messages matching a corresponding mask and/or matching information.

In some embodiments, a mask may represent certain values or states for one or more bits or bytes in a sequence of bits or bytes that can appear (e.g., at some offset in a header portion of a received message) in a received message and may be usable for determining whether a fast-path identification rule can identify a message. For example, for each bit represented in a mask, the bit value may be "1", "0", or a wildcard value that may be either "1" or "0" (e.g., represented as "?" in FIG. 3). In this example, fast-path processing module 106 may compare each bit value associated with the mask to bits of a message header portion from a received message. If the message header portion matches the mask, then fast-path processing module 106 may use the associated identification information to identify the message.

In some embodiments, a mask may be usable for identifying relevant information for analysis by fast-path processing module 106. For example, fast-path processing module 106 may use a bitwise operation and a mask associated with fast-path identification rule 310 to identify a relevant message header portion. In this example, the message header portion may be compared with matching information (e.g., a match key) associated with fast-path identification rule 310 to determine whether fast-path identification rule 310 can identify the received message. If fast-path identification rule 310 can identify the received message, fast-path processing module 106 may use identification information associated with fast-path identification rule 310 for indicating a particular protocol, session, type, or other information associated with the message.

In some embodiments, a mask or representations therein may be determined, affected, or based on various factors and/or usage. For example, fast-path identification rule 310 may include an inverse mask usable with bitwise or operations. In this example, for each bit represented in an inverse mask, the bit value may be "1" or "0", where a "1" may represent a wildcard value. In another example, fast-path identification rule 308 may include a mask usable with bitwise and operations. In this example, for each bit represented in a mask, the bit value may be "1" or "0", where a "0" may represent a wildcard value.

In some embodiments, each of fast-path identification rules 300, 302, 304, 306, 308, and 310 may be associated with a particular protocol and may include one or more bitmasks of various lengths. For example, fast-path identification rule 300 may be associated with a "Protocol A" and may include a related bitmask containing enough bits or bytes to accurately identify or distinguish a message as being associated with "Protocol A". In another example, fast-path identification rule 300 may be associated with a "Protocol C" and may include multiple bitmasks of various lengths depending on protocol specifications (e.g., bitmasks for a minimum length header of "Protocol C"—a maximum length header of "Protocol C"). In yet another example, each of fast-path identification rules 300, 302, 304, 306, 308, and 310 may include one or more bitmasks of similar and/or "standard" sizes, such as bitmasks having lengths of 128 bytes or 256 bytes. In this example, if identification requires less than the default bitmask size, all superfluous bits (e.g. bits not needed for identification purposes) may indicate wildcard (e.g., "don't care") states.

In some embodiments, each of fast-path identification rules 300, 302, 304, 306, 308, and 310 and/or masks therein may be associated with a priority level and/or an application order. For example, fast-path processing module 106 may apply masks from more specific (e.g., longer and/or less wildcard containing bitmasks) to less specific (e.g., shorter and/or more wildcard containing bitmasks. In this example, fast-path processing module 106 may be configured to utilize the more specific masks and may avoid using less specific masks unless no other matches are found.

In some embodiments, each of fast-path identification rules 300, 302, 304, 306, 308, and 310 and/or masks therein may be processed in parallel (e.g., concurrently) or sequential. For example, fast-path processing module 106 may be capable of identifying messages using parallel processing by performing mask comparisons for multiple fast-path identification rules concurrently. In another example, fast-path processing module 106 may be capable of identifying messages using serial processing by performing mask comparisons for fast-path identification rules one at a time, e.g., based on priority level or application order.

In some embodiments, each of fast-path identification rules 300, 302, 304, 306, 308, and 310 may be implemented using software or code. For example, fast-path identification rule 300 may include assembly language instructions. In this example, the assembly instructions may be stored in MIM storage 108 and may be executable by fast-path processing module 106, e.g., via a function pointer or other mechanism.

It will also be appreciated that fast-path identification rules 300, 302, 304, 306, 308, and 310 is for illustrative purposes and that different and/or additional information may be utilized by fast-path processing module 106.

Figure 4:
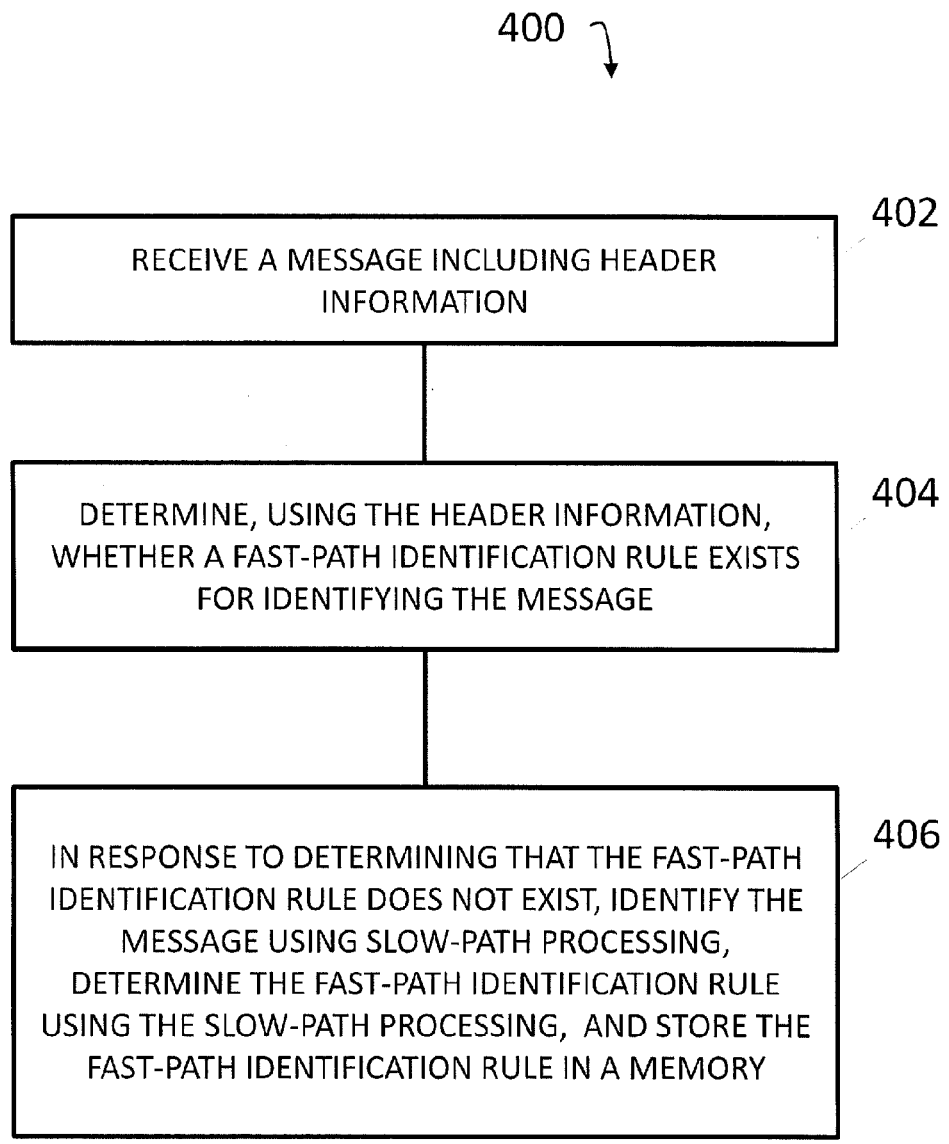
FIG. 4 is a diagram illustrating an exemplary process for optimized message processing according to an embodiment of the subject matter described herein.

FIG. 4 is a diagram illustrating an exemplary process for optimized message processing according to an embodiment of the subject matter described herein. In some embodiments, exemplary process 400, or portions thereof, may be performed by or at MIM 102 (e.g., an IP message interceptor or inspection device), slow-path processing module 104, fast-path processing module 106, and/or another node or module. In some embodiments, exemplary process 400 may include steps 402, 404, 406, 408, 410, and/or 412.

At step 402, a message including header information may be received. For example, a HTTP message may be received that includes a header portion and payload portion. In this example, the header portion may include header information.

At step 404, it may be determined, using the header information, whether a fast-path identification rule exists for identifying the message. For example, MIM 102 may compare header information from a message to one or more stored fast-path identification rules (e.g., by comparing bits and/or masks). In this example, if a stored fast-path identification rule matches the extracted header information, then MIM 102 may determine that the fast-path identification rule is usable for identifying the message.

At step 406, in response to determining that the fast-path identification rule does not exist, the message may be identified using slow-path processing (e.g., processing associated with slow-path processing module 104), the fast-path identification rule may be determined using the slow-path processing, and the fast-path identification rule may be stored in a memory. For example, slow-path processing module 104 may analyze header information associated with a received message using one or more conditional statements, e.g., stored in protocol tree 200. In this example, using a extant (e.g., traversed) path of protocol tree 200, or conditional statements therein, used in identifying a message, MIM 102 or modules therein may generate and store a fast-path identification rule that includes a mask representing or comparable to the one or more conditional statements and may be usable for indicating or identifying messages that match the mask.

In some embodiments, in response to determining that the fast-path identification rule does not exist, a fast-path identification rule may be generated using the slow-path processing and then fast-path processing module 106 may identify a message using the fast-path identification rule.

In some embodiments, e.g., where a fast-path rule is implemented in software, computer executable instructions (e.g., assembly language instructions or other programming language instructions) may be usable for implementing masking and/or comparison operations. For example, if it is determined that a single byte should be compared for identifying a protocol, a single compare instruction may be used in a fast-path rule implemented in software for comparing the single byte. In this example, the compare instruction may significantly faster than performing a mask and comparisons across the entire rule.

In some embodiments, in response to determining that a fast-path identification rule does exist, fast-path processing module 106 may identify a message using the fast-path identification rule.

In some embodiments, determining a fast-path identification rule using processing associated with slow-path processing module 104 may include identifying a message using a protocol tree associated with slow-path processing module 104 and generating the fast-path identification rule based on processing associated with the protocol tree.

In some embodiments, determining a fast-path identification rule using processing associated with slow-path processing module 104 may include selecting the fast-path identification rule from among a plurality of predefined fast-path identification rules. For example, prior to receiving a message for identification (e.g., at initialization of MIM 102), a number of fast-path identification rules may be pre-computed or predefined and may be stored in a data storage device or other memory. In this example, after determining that a received message can be identified by one of these stored fast-path identification rules, MIM 102 may be configured to select the appropriate rule and store the selected rule in a different memory, e.g., a cache that is faster than the data storage device, for use by fast-path processing module 106.

In some embodiments, a fast-path identification rule may include a bitmask, a multi-bitmask, a byte mask, and/or a multi-byte mask.

In some embodiments, generating a fast-path identification rule may be in response to determining that the fast-path identification rule meets or exceeds a utility threshold.

In some embodiments, prior to storing a fast-path identification rule in the memory, another fast-path identification rule stored in the memory may be deleted. For example, a plurality of fast-path identification rules may be stored in MIM storage 108. In this example, MIM storage 108 may store a particular number of fast-path identification rules, where if a new rule is added, a less frequently accessed or less popular (e.g., a rule having less perceived or determined utility) may be overwritten.

In some embodiments, identifying, by fast-path processing module 106, a message using a fast-path identification rule may include processing header information using the fast-path identification rule and one or more bitwise operations.

In some embodiments, identifying, by fast-path processing module 106, a message using a fast-path identification rule may include identifying, using the fast-path identification rule, that the message includes one or more header types or protocols.

In some embodiments, slow-path processing module 104 or fast-path processing module 106 may identify a message using serial processing or parallel processing.

In some embodiments, a fast-path identification rule may be one of a plurality of fast-path identification rules stored in a memory.

In some embodiments, a plurality of fast-path identification rules may be indexed, sorted, or processed in a particular order.

In some embodiments, MIM 102, slow-path processing module 104, and/or fast-path processing module 106 may implemented using software executing on a processor, a computing platform, a logic device, a CPLD, an FPGA, or an ASIC. For example, optimized message processing may be performed by a processor, a computing platform, a programmable or non-programmable logic device, a field-programmable gate array, or an application specific integrated circuit.

It will also be appreciated that exemplary process 400 is for illustrative purposes and that different and/or additional actions may be used. It will also be appreciated that various actions described herein may occur in a different order or sequence.

It should be noted that MIM 102, slow-path processing module 104, fast-path processing module 106, and/or functionality described herein may constitute a special purpose computing device. Further, slow-path processing module 104, fast-path processing module 106, and/or functionality described herein can improve the technological field of message processing by providing mechanisms for various processing optimizations, e.g., generating fast-path identification rules (e.g., masks and/or other information) based on conditional statements (e.g., "if-else" logic) and storing the fast-path identification rules in memory for future use.

The subject matter described herein for optimized message processing improves the functionality of nodes, e.g., testing platforms, routers, switches, and/or application servers, and networks in general by providing for more efficient message processing. It should also be noted that a computing platform that implements the subject matter described herein may comprise a special purpose computing device (e.g., a testing platform) usable to perform optimized message processing and/or message identification.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimized message processing, the method comprising:
   receiving a message including header information;
   determining, using the header information, that a fast-path identification rule does not exist for identifying a protocol of the message; and
   in response to determining that the fast-path identification rule does not exist:
      identifying the protocol of the message using slow-path processing,
      determining the fast-path identification rule using the slow-path processing, wherein the fast-path identification rule includes a mask that indicates locations of protocol-identifying data in messages associated with the protocol, and
      storing the fast-path identification rule in a memory.

2. The method of claim 1 comprising:
   in response to determining that the fast-path identification rule does exist, identifying, using fast-path processing, the protocol of the message using the fast-path identification rule.

3. The method of claim 1 wherein determining the fast-path identification rule using the slow-path processing includes identifying the protocol of the message using a protocol tree and generating the fast-path identification rule using the protocol tree.

4. The method of claim 1 wherein determining the fast-path identification rule using the slow-path processing includes selecting the fast-path identification rule from among a plurality of predefined fast-path identification rules.

5. The method of claim 1 wherein the mask is a bitmask, a multi-bitmask, a byte mask, or a multi-byte mask.

6. The method of claim 1 wherein prior to storing the fast-path identification rule in the memory, deleting another fast-path identification rule stored in the memory.

7. The method of claim 2 wherein identifying the protocol of the message using the fast-path identification rule includes identifying, using the fast-path identification rule, that the message includes one or more header types or protocols.

8. The method of claim 2 wherein the slow-path processing or the fast-path processing identifies the message using serial processing or parallel processing.

9. The method of claim 1 wherein the fast-path identification rule is one of a plurality of fast-path identification rules stored in the memory.

10. The method of claim 9 wherein the plurality of fast-path identification rules are indexed, sorted, or processed in a particular order.

11. The method of claim 2 wherein the slow-path processing or the fast-path processing is implemented using software executing on a processor, a computing platform, a logic device, a complex programmable logic device (CPLD), a field-programmable gate array (FPGA), or an application specific integrated circuit (ASIC).

12. A system for optimized message processing, the system comprising:
    a slow-path processing module configured to identify a protocol of a message using slow-path processing; and
    a message identification module (MIM), wherein each of the slow-path processing module and the MIM is implemented using software executing on a processor, a computing platform, a logic device, a complex programmable logic device (CPLD), a field-programmable gate array (FPGA), or an application specific integrated circuit (ASIC), wherein the MIM is configured to:
       receive a message including header information;
       determine, using the header information, that a fast-path identification rule does not exist for identifying a protocol of the message; and
       in response to determining that the fast-path identification rule does not exist:
          identify the protocol of the message using the slow-path processing module,
          determine the fast-path identification rule using the slow-path processing module, wherein the fast-path identification rule includes a mask that indicates locations of protocol-identifying data in messages associated with the protocol, and
          store the fast-path identification rule in a memory.

13. The system of claim 12 comprising:
    a fast-path processing module configured to identify the protocol of the message using the fast-path identification rule.

14. The system of claim 12 wherein the MIM is configured to determine the fast-path identification rule using the slow-path processing module by identifying the protocol of the message using a protocol tree associated with the slow-path processing module and generating the fast-path identification rule using with the protocol tree.

15. The system of claim 12 wherein the MIM is configured to select the fast-path identification rule from among a plurality of predefined fast-path identification rules.

16. The system of claim 12 wherein the mask is a bitmask, a multi-bitmask, a byte mask, or a multi-byte mask.

17. The system of claim 12 wherein the MIM is configured to delete, prior to storing the fast-path identification rule in the memory, another fast-path identification rule stored in the memory.

18. The system of claim 13 wherein the fast-path processing module is configured to identify, using the fast-path identification rule, that the message includes one or more header types or protocols.

19. The system of claim 13 wherein the slow-path processing module or the fast-path processing module is configured to identify the protocol of the message using serial processing or parallel processing.

20. The system of claim 12 wherein the fast-path identification rule is one of a plurality of fast-path identification rules stored in the memory.

21. The system of claim 18 wherein the plurality of fast-path identification rules are indexed, sorted, or processed in a particular order.

22. The system of claim 13 wherein the fast-path processing module is implemented using software executing on a processor, a computing platform, a logic device, a complex programmable logic device (CPLD), a field-programmable gate array (FPGA), or an application specific integrated circuit (ASIC).

23. A non-transitory computer readable medium comprising computer executable instructions embodied in the computer readable medium that when executed by a processor of a computer cause the computer to perform steps comprising:
   receiving a message including header information;
   determining, using the header information, that a fast-path identification rule does not exist for identifying a protocol of the message; and
   in response to determining that the fast-path identification rule does not exist:
     identifying the protocol of the message using slow-path processing,
     determining the fast-path identification rule using the slow-path processing, wherein the fast-path identification rule includes a mask that indicates locations of protocol-identifying data in messages associated with the protocol; and
     storing the fast-path identification rule in a memory.

\* \* \* \* \*